(12) United States Patent
Wilson et al.

(10) Patent No.: US 7,198,139 B2
(45) Date of Patent: Apr. 3, 2007

(54) AIR GUIDE FOR COOLING A VEHICLE BRAKE ASSEMBLY

(75) Inventors: Derek Wilson, Dublin, OH (US);
Shawn Crichley, Dublin, OH (US);
Michael Missig, Powell, OH (US)

(73) Assignee: Honda Motor Co., Ltd., Tokyo (JP)

( * ) Notice: Subject to any disclaimer, the term of this patent is extended or adjusted under 35 U.S.C. 154(b) by 89 days.

(21) Appl. No.: 10/751,686

(22) Filed: Jan. 5, 2004

(65) Prior Publication Data

US 2005/0145455 A1    Jul. 7, 2005

(51) Int. Cl.
*B62D 35/00* (2006.01)

(52) U.S. Cl. .......................... 188/264 AA; 296/180.1; 296/208

(58) Field of Classification Search ............ 188/264 R, 188/264 A, 264 AA; 296/180.1, 208; D12/181, D12/180, 206
See application file for complete search history.

(56) References Cited

U.S. PATENT DOCUMENTS

| | | | | |
|---|---|---|---|---|
| D172,035 S | * | 4/1954 | Krusemark ................. D12/181 |
| D223,105 S | * | 3/1972 | Hamond ..................... D12/181 |
| D251,245 S | * | 3/1979 | Senour ....................... D12/181 |
| D263,462 S | * | 3/1982 | Pare ........................... D12/181 |
| 4,473,139 A |   | 9/1984 | Oka et al. |
| D280,497 S | * | 9/1985 | Sullivan et al. ............ D12/181 |
| 4,620,616 A |   | 11/1986 | Martin |
| 4,772,299 A | * | 9/1988 | Bogusz ................. 188/264 AA |
| 4,805,747 A |   | 2/1989 | Moedinger et al. |
| 4,810,021 A | * | 3/1989 | Burst ....................... 296/180.1 |
| 4,901,826 A |   | 2/1990 | Preiss |
| 4,979,597 A | * | 12/1990 | Mehlitz .................. 188/264 R |
| D316,390 S | * | 4/1991 | Ichinose ..................... D12/181 |
| D322,239 S | * | 12/1991 | Taylor ........................ D12/181 |
| D325,187 S | * | 4/1992 | Messmore et al. ......... D12/181 |
| 5,121,818 A | * | 6/1992 | McComic ............. 188/264 AA |
| 5,121,972 A |   | 6/1992 | Glover |
| 5,427,212 A |   | 6/1995 | Shimazu et al. |
| 5,511,847 A | * | 4/1996 | Weisbarth et al. ........ 296/180.1 |
| 5,706,915 A |   | 1/1998 | Shimazu et al. |
| 5,954,405 A |   | 9/1999 | Toman |
| 6,033,010 A | * | 3/2000 | Preiss ....................... 296/180.1 |
| D427,958 S | * | 7/2000 | Corner ....................... D12/181 |
| D429,199 S | * | 8/2000 | Bulaquena et al. ........ D12/181 |
| 6,116,365 A | * | 9/2000 | Preiss et al. ................ 180/68.1 |
| 6,257,674 B1 |   | 7/2001 | Dagh et al. |
| 6,260,911 B1 |   | 7/2001 | Becker |
| 6,315,091 B1 | * | 11/2001 | Nilsen et al. ........... 188/264 A |
| 6,357,562 B1 |   | 3/2002 | Toman et al. |
| 6,446,766 B1 |   | 9/2002 | Cornolti et al. |
| D495,636 S | * | 9/2004 | Iwata ......................... D12/181 |

* cited by examiner

*Primary Examiner*—Robert A. Siconolfi
(74) *Attorney, Agent, or Firm*—Rankin, Hill, Porter & Clark LLP

(57) ABSTRACT

A brake cooling system that directs cooling air to a vehicle brake assembly. The cooling system includes an air guide that, during operation of the vehicle, receives air, pressurizes air, and directs pressurized air to the brake assembly. The air guide cooperates with a support structure, such as a wheel well liner, provided by the vehicle to define an air passageway that is gradually reduced in cross-section toward the distal end of the air guide so as to transform a relatively low pressure incoming air stream into a relatively higher pressure outgoing air stream. The outgoing air stream is focused on the brake assembly to thereby cool the brake assembly.

7 Claims, 3 Drawing Sheets

AIR GUIDE FOR COOLING A VEHICLE BRAKE ASSEMBLY

BACKGROUND OF THE INVENTION

1. Field of the Invention

The present invention relates to a brake cooling system, and more particularly, to an air guide that directs pressurized cooling air to a vehicle brake assembly.

2. Description of Related Art

Brake assemblies are used to slow and stop vehicle movement. Brake assemblies often include a rotor attached to the wheels of a vehicle, and calipers positioned in a clamping arrangement about surfaces of the rotor. When slowing or stopping is initiated, hydraulic pressure from a master cylinder is supplied to the caliper, thereby causing the brake pads carried on the caliper to frictionally engage and clamp the rotor and thereby slowing rotation of the rotor and the associated wheel.

While this common type of braking device effectively slows the vehicle's movement, the frictional engagement of the brake pads against the rotor generates an enormous amount of heat energy. This heat energy causes heating of the brake assembly. If this heat is not properly dissipated from the brake assembly, damage to the brake assembly can result. For example, excessive brake heat can cause brake jutter and premature brake deterioration.

In an attempt to resolve this problem, manufacturers have provided air passageways for use with channeling devices in vehicles to channel air to the brake assembly. This channeling acts to blow air across the brake assembly, thereby dissipating the heat from the brake assembly. One such channeling device employs a duct that directs air from the lower part of a vehicle to a vehicle's brake assembly. While this device does provide enhanced cooling characteristics of the brake assembly, it has some drawbacks.

The channeling device communicates air from beneath the vehicle and delivers it to the brakes. However, this known channeling device does not pressurize the air, but rather only diverts air toward and across the vehicle brakes. Furthermore, placement of the channeling device tends to reduce the amount of room available for other components.

Another cooling system provides a front fascia having an opening formed therein that communicates with a passageway for providing air to the vehicle's front brakes. The passageway directs air laterally and rearwardly toward the brakes. This known passageway increases in cross section from the front of the passageway to the rear of the passageway and therefore the pressure/velocity of the air decreases as it flows through the passageway. One drawback of this cooling system is that relatively higher-pressure air, which would provide more efficient cooling, cannot be provided to the brake assembly.

There exists a need in the art for a device that provides effective and efficient cooling for a brake assembly. Moreover, there exists a need in the art for a device that provides efficient cooling to a brake assembly without reducing the amount of room available for other components.

SUMMARY OF THE INVENTION

The present invention decreases the temperature of the brake assembly before, during, and after mild or hard braking, and thereby improves the performance and extends the life of the brake assembly. The present invention is directed toward a device for providing effective cooling for brake rotors that utilizes the ram air affect at the front of a vehicle.

In accordance with the invention, an air guide is adapted to be secured to a vehicle in a position for directing cooling air toward a vehicle brake assembly. The air guide is a unitary structure having a forward facing front wall, first and second lateral support wings, and an air funneling wall. The front wall is at proximal end of the air guide and the first and second lateral support wings extend laterally and upwardly from the front wall. The air funneling wall is integrally attached to the front wall and the first and second lateral support wings, and extends rearwardly and upwardly from the front wall so as to define the distal end of the air guide. The air funneling wall includes a first portion and a second portion. The first portion is secured to the front wall, the second portion is secured to the first lateral support wing, and the first and second portions are oriented at an angle to one another.

The air guide also includes means for securing the air guide to the vehicle. When the air guide is secured to a support structure of the vehicle, the support structure and the air guide cooperate to form an air guide assembly that defines a passageway, with the air funneling wall delimiting a lower extent of the air passageway and the support structure delimiting an upper extent of the passageway. The air passageway is gradually reduced in cross-section toward the distal end of the air guide so as to transform a relatively low pressure incoming air stream into a relatively higher pressure outgoing air stream. The outgoing air stream is focused on the brake assembly, preferably on an air deflector associated with the brake assembly, thereby cooling the brake assembly.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 1:
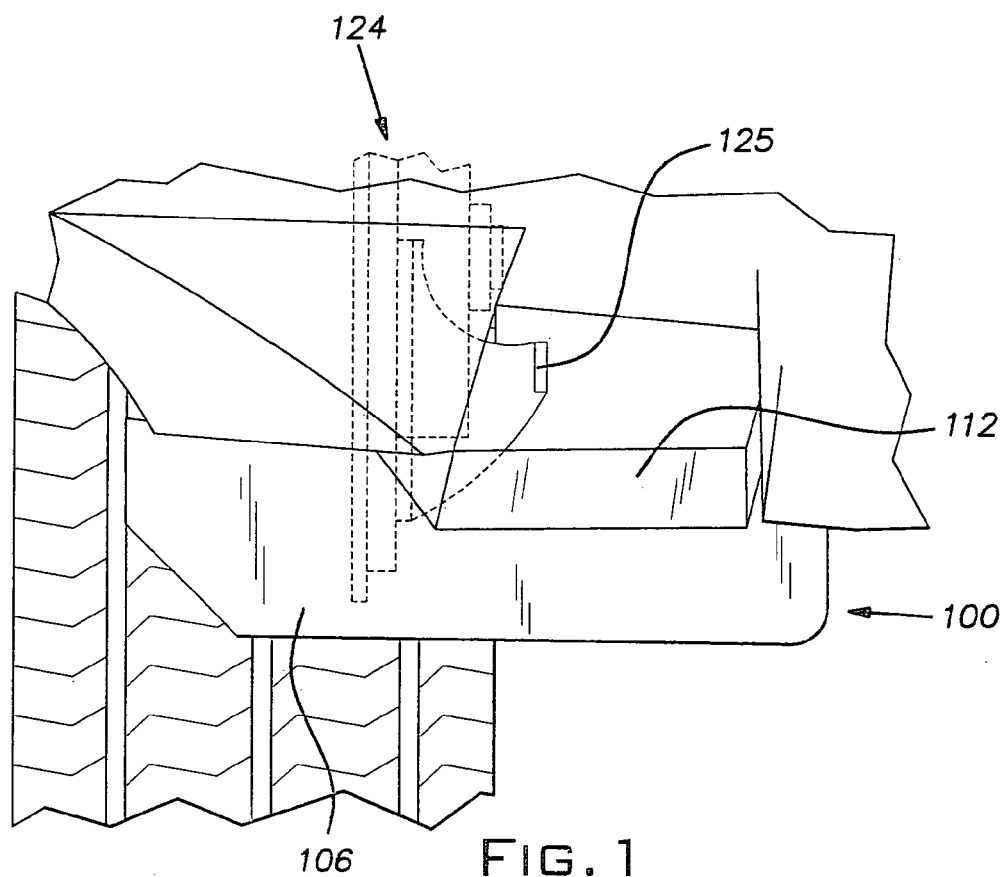
FIG. 1 is a front view of the air guide of the present invention installed on the underside of a vehicle.
Figure 2:
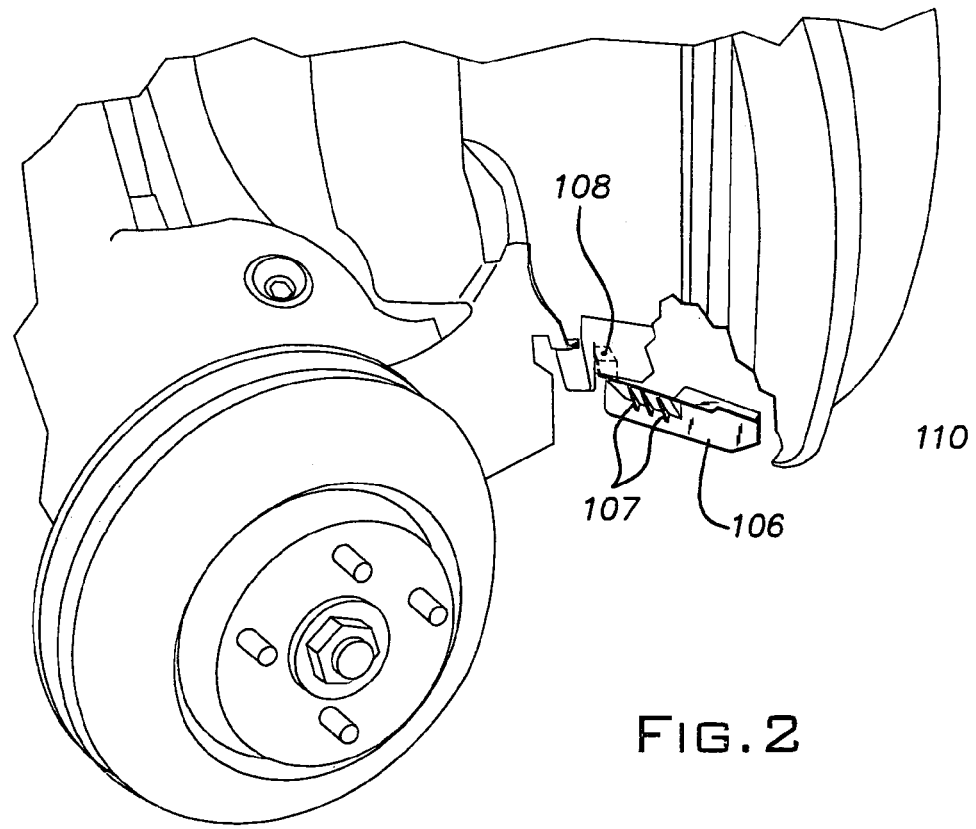
FIG. 2 is a rear perspective view of the air guide of the present invention installed to the underside of a vehicle, with portions broken away for purposes of clarity.

With reference to FIGS. 1–6, an air guide 100 according to the invention is shown to include a proximal end 102 and a distal end 104. The proximal end 102 faces forward toward the front of the vehicle 101, and the distal end 104 faces rearward toward the associated vehicle brake assembly 124. A front wall 106 is disposed at the proximal end 102 of the air guide 100 and is generally U-shaped, as shown best in FIG. 4. First and second lateral support wings 108, 110 extend laterally and upwardly from the front wall 106.

An air funneling wall 112 is secured to the front wall 106 and to the first and second lateral support wings 108, 110.

The air funneling wall 112 extends distally and upwardly from the front wall 106, and defines the distal end 104 of the air guide 100. A forward end of the air funneling wall 112 is secured to the front wall 106 while lateral ends of the air funneling wall 112 are secured to the first and second lateral support wings 108, 110, respectively. A series of gusset-type braces 107 interconnect a rear of the front wall 106 with a bottom of the air funneling wall 112, and thereby stiffen the front wall 106 against rearward deformation and the air funneling wall 112 against downward deformation.

The first lateral support wing 108 includes a lower portion 108a and an upper portion 108b. The lower portion 108a is secured to the front wall 106 and the air funneling wall 112. A lower extent of a forward edge of the upper portion 108b is attached to the front wall while the lower edge of the upper portion 108b is attached to the lower portion 108a. In the illustrated embodiment, the upper portion 108b is at an angle to the lower portion 108a to facilitate attachment of the air guide 100 to the vehicle.

The second lateral support wing 110 includes a first portion 110a and a second portion 110b. The first portion 110a extends at an angle between the air funneling wall 112, the front wall 106, and the second portion 110b. The second portion 110b of the second lateral support wing 110 extends rearwardly from the front wall 108.

The air guide 100 is preferably formed from a suitable material having sufficient flexibility/rigidity, and toughness to withstand not only the air pressure, which is significant, but also the impact force of road debris that will be experienced. For example, the air guide 100 could be formed from a metal, such as steel, or a plastic material, such as polyethylene or polypropylene. Preferably, the air guide 100 is integrally molded from a plastic material sold by DuPont Kabushiki Kaisha under the tradename EvaFlex 561, which has been found to exhibit a desirable balance between weight, flexibility/rigidity and durability.

The air guide 100 is also provided with means for securing the air guide 100 to the host vehicle 101. The air guide 100 is adapted to be attached to a support structure 120 that is provided on the underside of the vehicle 101. The support structure 120 is preferably the wheel well liner, but may also be a portion of the unibody frame already present on the vehicle, or may be a specially constructed mounting plate secured to the unibody frame, or another body panel or structure. Therefore, although the wheel well liner is preferred, the present invention is not necessarily limited to any particular support structure, as it is. contemplated that, depending upon the host vehicle, many equivalent support structures may be interchangeably used with the present invention.

In any event, the air guide 100 is secured to the support structure 120 via the first and second lateral support wings 108, 110. More specifically, each of the lateral support wings 108, 110 define holes 109 through which a fastener extends to connect the air guide 100 to the support structure 120. Preferably, the fastener is an elastomeric, bayonet-type push-in pin 119 (FIG. 6), which is well known in the art. The pins 119 affix the air guide 100 to the support structure 120 in a non-removable fashion.

The first lateral mounting wing 108 is received within a recess formed in the wheel well liner 120 (i.e., between first (forward) and second (rearward) portions 121). The second lateral mounting wing 110 lays on the supporting structure 120 in face-to-face contact therewith. Accordingly, the air guide 100 is unified with the wheel well liner by the pins 119 and cooperation between the supporting structure 120 and the mounting wings 108, 110.

The support structure 120 and the air guide 100 form an air guide assembly and cooperate to define an air passageway 118. The air funneling wall 112 defines a lower extent of the air passageway 118 while the support structure 120 defines an upper extent of the air passageway. Since the air funneling wall 112 slopes upwardly as it extends rearwardly away from the front wall 106, the air passageway 118 has a cross section that becomes gradually smaller as it extends from the proximal end 102 toward the distal end 104 of the air guide 100.

Figure 3:
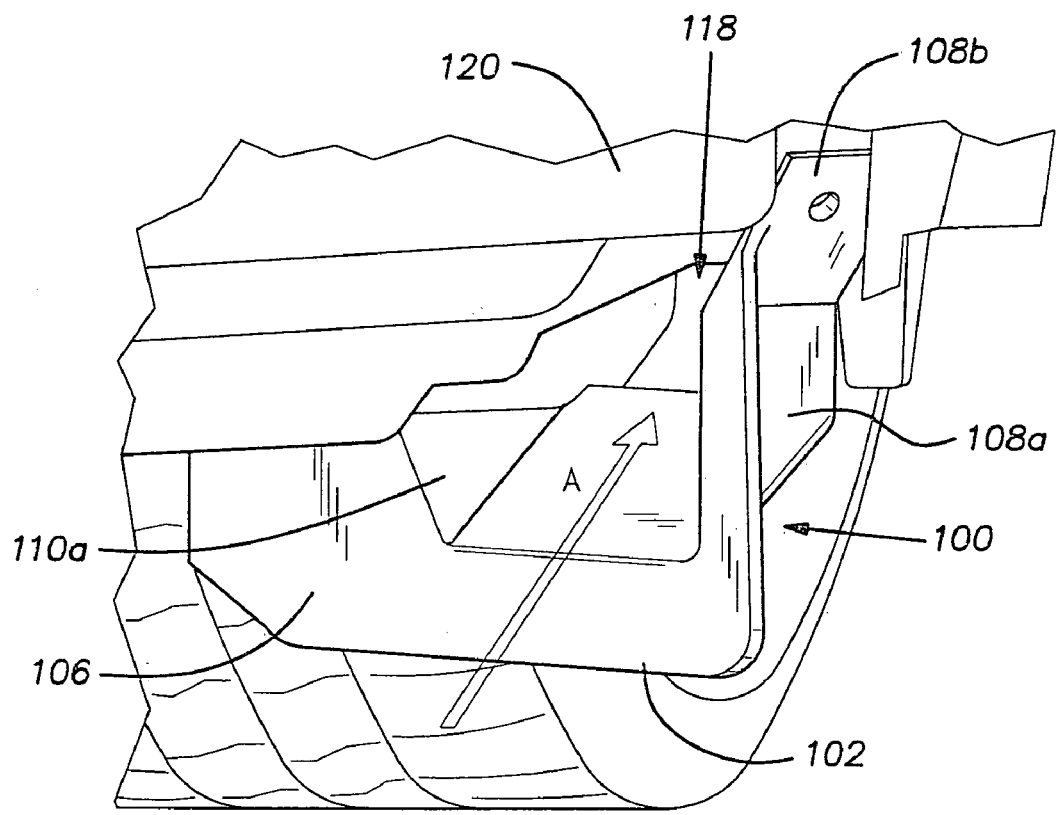
FIG. 3 is a front perspective view of the air guide of the present invention.
Figure 4:
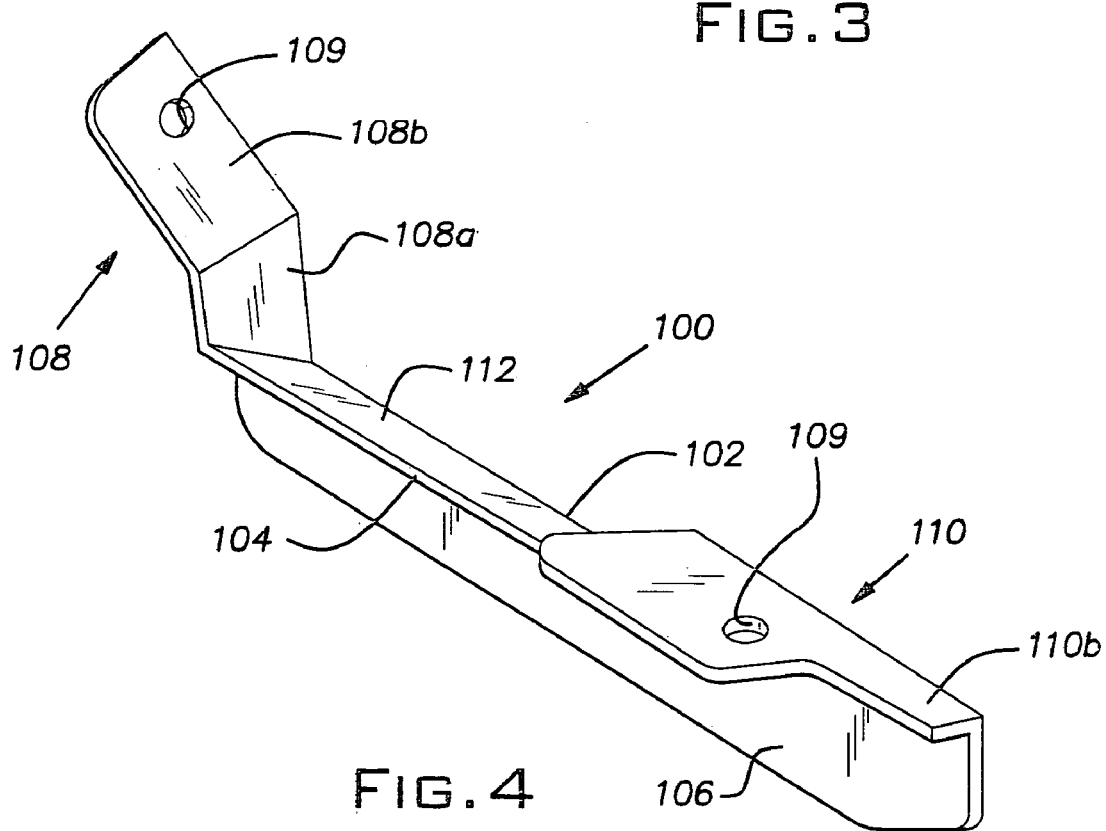
FIG. 4 is a top perspective view of the air guide of the present invention.
Figure 5:
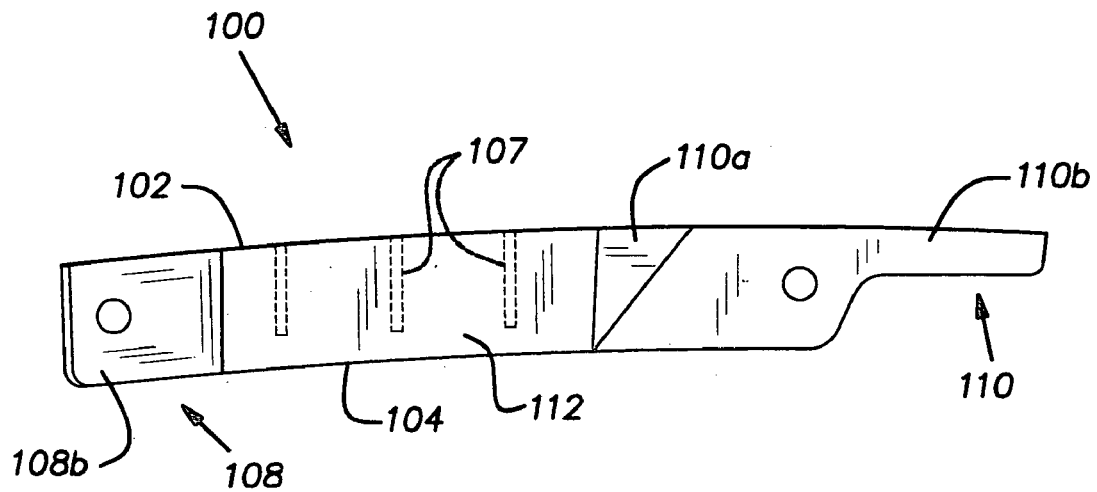
FIG. 5 is a top view of the air guide of the present invention.
Figure 6:
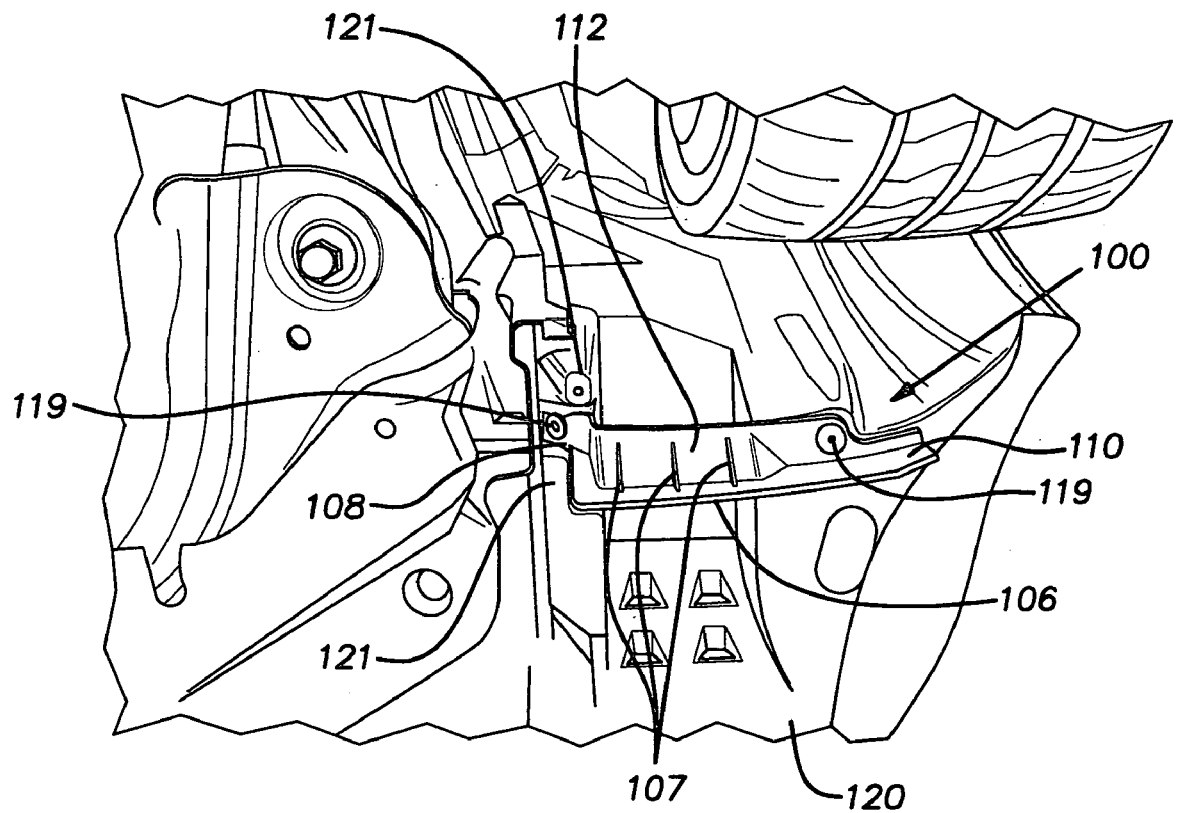
FIG. 6 is a bottom plan view of the air guide installed on a wheel well liner of the vehicle.

As the vehicle containing the air guide assembly cooling moves forwardly, air enters the air passageway 118 at the proximal end 102 of the air guide 100, and exits the air passageway 118 at the distal end 104 of the air guide 100, as illustrated by arrow A in FIG. 3. The reduction in cross-section transforms a relatively low pressure incoming air stream into a relatively high pressure outgoing air stream. The air passageway 118 is formed so that the outgoing air stream is directed toward the rearwardly adjacent vehicle wheel assembly 124. More specifically, the outgoing air stream is directed toward an air deflector 125 that is associated with the wheel assembly and operable to direct cooling air to the brake assembly disposed thereon. Insofar as the air deflector 125 is known in the art and does not form a part of the present invention, such air deflector will not be described more fully hereinafter.

Accordingly, by incorporating or integrating the air guide 100 into the wheel well liner, a high pressure cooling air stream is supplied to the air deflector 125 and thus to the brake assembly. Moreover, the air guide 100 of the present invention is low-profile, unobtrusive, and durable, and therefore provides an inconspicuous addition to the basic automobile structure.

Additional advantages and modifications will readily occur to those skilled in the art. Therefore, the invention in its broader aspects is not limited to the specific details and illustrative examples shown and described herein. Accordingly, various modifications may be made without departing from the spirit and scope of the invention as defined by the appended claims and their equivalents.

What is claimed is:

1. An air guide assembly operable to direct cooling air toward a brake assembly, said air guide assembly comprising a support structure and an air guide, said support structure being secured to a vehicle and said air guide being secured to said support structure in a position forward of the brake assembly, the air guide having a forward facing proximal end and a rearward facing distal end, and comprising:

a generally U-shaped, planar front wall disposed at the proximal end of the air guide, generally perpendicular to forward motion of the vehicle;

first and second lateral support wings extending rearwardly and upwardly from the front wall;

a generally planar air funneling wall integrally secured to the front wall, the first lateral support wing, and the second lateral support wing, said air funneling wall extending distally from the front wall so as to define the distal end of the air guide;

wherein said first and second lateral support wings are adapted to be directly and removably attached to the vehicle support structure from below the support structure while the air funneling wall extends upwardly and rearwardly from the front wall and cooperates with the support structure to define an air passageway that is gradually reduced in cross-section toward the distal end of the air guide so as to transform a relatively low pressure incoming air stream into a relatively higher pressure outgoing air stream, said outgoing air stream being directed toward the brake assembly so as to cool the brake assembly.

2. The air guide assembly according to claim 1, wherein said air guide further comprises a plurality of gussets that extend between said air funneling wall and said front wall and serve to stiffen said air funneling wall and said front wall against deformation.

3. An assembly for providing cooling air to a vehicle brake assembly, comprising:
   a wheel well liner secured to said vehicle at a location relatively forward of said vehicle brake assembly; and,
   an air guide, said air guide comprising:
      a forward facing proximal end and a rearward facing distal end, and comprising:
      a generally U-shaped, planar front wall disposed at the proximal end of the air guide, generally perpendicular to forward motion of the vehicle;
      first and second lateral support wings extending laterally and upwardly from the front wall, for securing the air guide to the wheel well liner; and,
      a generally planar air funneling wall integrally secured to the front wall and to the first lateral support wing and the second lateral support wing, and extending distally from the front wall so as to define the distal end of the air guide;
   wherein said first and second lateral support wings are directly attached to the wheel well liner, said air funneling wall extends upwardly and rearwardly from the front wall cooperates with the vehicle wheel well liner and the lateral support wings to define an air passageway that is gradually reduced in cross-section toward the distal end of the air guide so as to transform a relatively low pressure incoming air stream into a relatively higher pressure outgoing air stream that is directed toward and cools the brake assembly.

4. The assembly according to claim 3, wherein said lateral support wings are affixed directly to the wheel well liner by mechanical fasteners.

5. The air guide assembly according to claim 4, wherein said air guide further comprises a plurality of gussets that extend between said air funneling wall and said front wall and serve to stiffen said air funneling wall and said front wall against deformation.

6. An air guide assembly operable to direct cooling air toward a vehicle brake assembly, said air guide assembly comprising a support structure, an air deflector, and an air guide, said support structure being secured to a vehicle, said air deflector being disposed adjacent to the brake assembly, said air guide being secured to said support structure at a position forward of the vehicle brake assembly, the air guide having a forward facing proximal end and a rearward facing distal end, and comprising:
   a generally U-shaped, planar front wall disposed at the proximal end of the air guide, generally perpendicular to forward motion of the vehicle;
   first and second lateral support wings extending rearwardly and upwardly from the front wall;
   a generally planar air funneling wall integrally secured to the front wall, the first lateral support wing, and the second lateral support wing, said air funneling wall extending distally from the front wall so as to define the distal end of the air guide;
   wherein said first and second lateral support wings are affixed to the support structure and the air funneling wall extends upwardly and rearwardly from the front wall and cooperates with the support structure to define an air passageway that is gradually reduced in cross-section toward the distal end of the air guide so as to transform a relatively low pressure incoming air stream into a relatively higher pressure outgoing air stream, the distal end of the air guide being shaped to direct the outgoing air stream toward the deflector, while said deflector directs air received from the air guide to the brake assembly so as to cool the brake assembly.

7. The air guide assembly according to claim 6, wherein said air guide further comprises a plurality of gussets that extend between said air funneling wall and said front wall and serve to stiffen said air funneling wall and said front wall against deformation.

* * * * *